May 16, 1950  W. K. McIVER  2,508,121
GEAR TRANSMISSION
Filed May 24, 1947
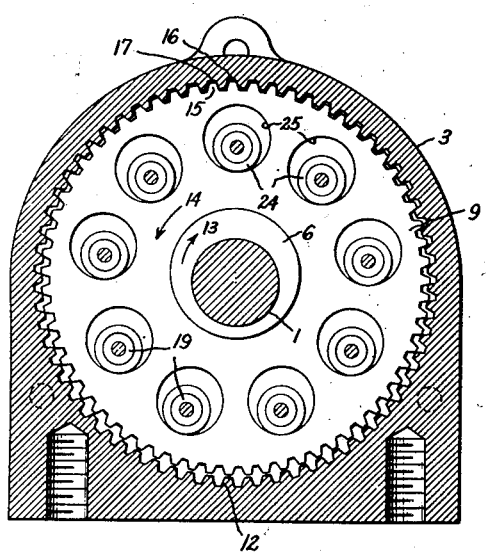
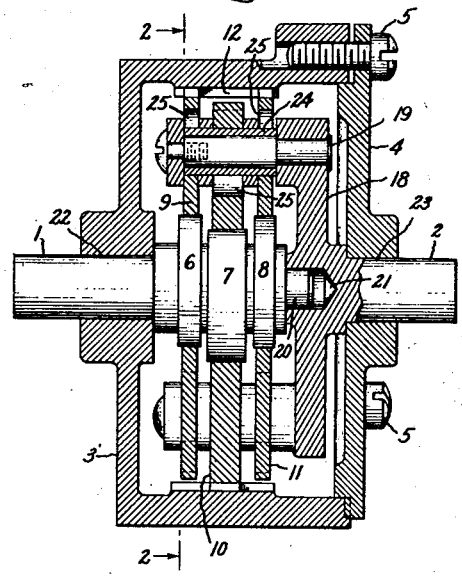
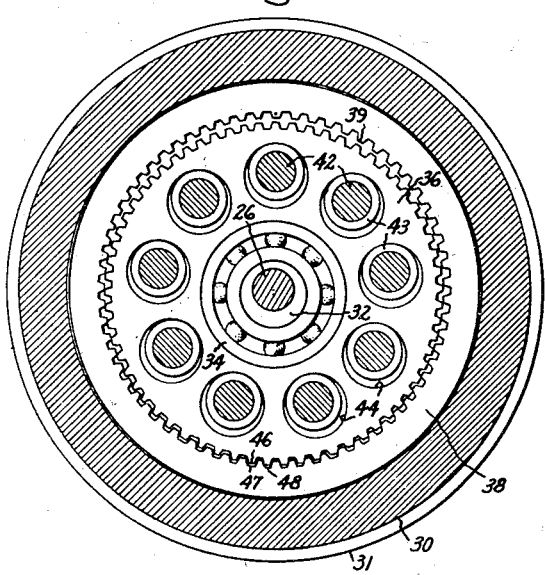
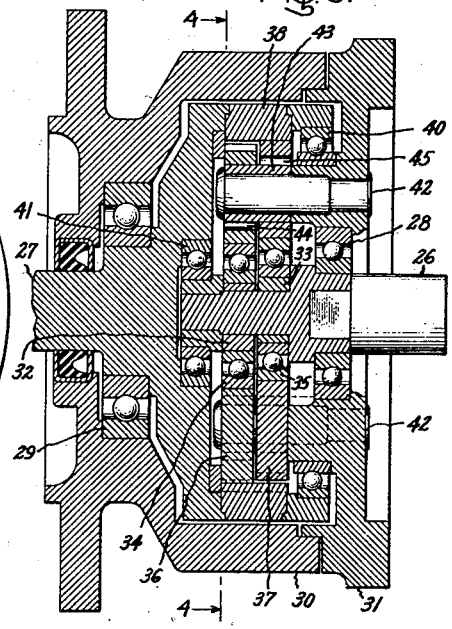
Inventor:
William K. McIver,
by Burrell P. Mack
His Attorney.

Patented May 16, 1950

2,508,121

UNITED STATES PATENT OFFICE 2,508,121

GEAR TRANSMISSION

William K. McIver, Fort Wayne, Ind., assignor to General Electric Company, a corporation of New York Application May 24, 1947, Serial No. 750,184

3 Claims. (Cl. 74—804)

This invention relates to speed changing gear transmissions and more particularly to such transmissions utilizing an eccentrically driven gear which meshes with an internal gear.

An object of this invention is the provision of an improved speed changing gear transmission.

Another object of this invention is the provision of an improved speed changing gear transmission wherein vibration is substantially eliminated.

Further objects and advantages of this invention will become apparent and this invention will be better understood from the following description referring to the accompanying drawing, and the features of novelty which characterize this invention will be pointed out with particularity in the claims annexed to and forming a part of this specification.

A feature of this invention is the provision of a plurality of eccentrically driven pinions which mesh with an internal gear having a greater number of teeth. Motion is transmitted from the pinions to the driven shaft by a multiple pin and aperture connection. By utilization of the proper number of such pins, pulsations producing undesirable vibration are effectively eliminated. Centrifugal forces due to the eccentric throw of the pinions and the tendency of the pinions to form a couple have been cancelled by proper proportionment and positioning of the pinion gears.

In the drawing, Fig. 1 is a side elevational view, partly in section, of an embodiment of this improved gear transmission. Fig. 2 is a cross section view taken along line 2—2 of Fig. 1. Fig. 3 is a side elevational view, partly in section, of another embodiment of this invention and Fig. 4 is a cross section taken along the line 4—4 of Fig. 3.

Referring now to Fig. 1, there is shown an embodiment of this invention having driving shaft 1, driven shaft 2, and enclosing case 3 having end plate 4 secured by any suitable means such as bolts 5. The shafts 1 and 2 are suitably journaled in bearings 22 and 23. Driving shaft 1 is provided with three eccentrics 6, 7, and 8. These eccentrics are true circles in form, and the axis of eccentricity of the outer eccentrics 6 and 8 are identically oriented. The axis of eccentricity of intermediate eccentric 7 is disposed 180° to the outer eccentrics 6 and 8. Concentrically arranged and freely rotating on eccentrics 6, 7, and 8, are pinion gears 9, 10, and 11. Stationary case 3 is provided with an internal toothed surface with which a number of the pinion teeth mesh. As shown in Fig. 1, due to the relative position of the eccentrics, pinions 9 and 11 will be meshing with gear 12 at the same point while pinion 10 will be meshing with gear 12 at a point 180° disposed from the points of contact of the outer two pinions. Internal gear 12 is provided with a greater number of teeth than the mating pinions 9, 10, and 11. In a machine of this type which I have constructed, the internal gear was provided with 65 teeth while the pinions were provided with 64 teeth.

It will now be apparent, that as driving shaft 1 is rotated causing eccentrics 6, 7 and 8 to rotate, pinions 9, 10, and 11 will be given a rolling motion around gear 12. If the gear 12 and pinions 6, 7 and 8 were provided with the same number of teeth, rotation of the driving shaft 1 would not cause the pinions to rotate since the pinion teeth in their rolling action would always mesh with the same teeth on the internal gear. However, assuming that gear 12 has one more tooth than the pinions, one revolution of driving shaft 1 causing the pinions to roll around gear 12 will cause the pinions to rotate the distance of one tooth in the opposite direction from the direction of rotation of driving shaft 1, as shown by the arrows 13 and 14 in Fig. 2. This is due to the fact that the 64 tooth pinions in rolling around the 65 tooth internal gear in one revolution of driving shaft 1 mesh with 64 teeth of the gear. Thus, when the driving shaft has completed one revolution, the pinions are one tooth away from their starting point, and, as shown in Fig. 2, pinion tooth 15 which was initially meshed with gear tooth 16, after one revolution, is now meshed with gear tooth 17.

It can now be seen, that for each revolution of driving shaft 1 in direction 13, the pinions will advance one tooth in direction 14. Therefore, in a machine having a 65 tooth gear and pinions with 64 teeth, the pinions will complete one full revolution for each 64 shaft revolutions, or a 64/1 speed reduction ratio. As can be seen, the rotation of the pinions is superimposed on the rolling eccentric motion around internal gear 12.

While pinions 9, 10, and 11 are completing one revolution for each 64 revolutions of driving shaft 1, some means must be provided to transmit this motion to driven shaft 2. In order to accomplish this motion transfer, the arrangement now to be described is provided. Driven shaft 2 is provided with a spider member 18 having a plurality of pins 19. For reasons to be hereinafter explained, these pins should be an odd number over seven, nine being shown here. These pins are parallel to the driven shaft 2, equidistant from its axis, and spaced equally annularly. The driven shaft 2 and spider member 18 are concentric with driving shaft 1 and projection 20 of the driving shaft may be suitably journaled in recess 21 in the spider member for supporting purposes.

Pins 19 are rigidly secured to spider member 18 and extend axially substantially beyond the first pinion 9. Each pin is provided with a freely rotating bushing 24. Pinions 9, 10, and 11, are provided with circular apertures 25 equal in number to pins 19 and similarly spaced, the centerline of the apertures 25 defining a circle equal in radius to the circle of centers of the pins 19. Pins 19 and bushings 24 extend through the apertures 25 and are seated therein as shown in Fig. 2.

It will now be readily seen that rotation of the pinions caused by rotation of the driving shaft 1 will be transmitted to the spider member 18 and to driven shaft 1. Since the pinions have an eccentric rolling motion, it is essential that the diameters of apertures 25' be properly proportioned so that bushings 24 will roll around the inner peripheries of the apertures with no sliding motion. It has been found that an aperture diameter equal to the sum of the bushing diameter and the amount of eccentric throw of the eccentrics is the proper diameter to secure this rolling action. The eccentric throw of an eccentric is equal to twice the eccentricity, the eccentricity being the distance representing the displacement of the center of the eccentric and the center of rotation.

An inspection of Fig. 2 will indicate that as the pinion rotates in the direction of the arrow 14, pressure will be applied by the walls of apertures 25 to drive pins 19 in the same direction. This pressure is applied in pulsations successively to each pin as the pinion rolls eccentrically around the gear 12. Thus, for each revolution of driving shaft 1, there will be nine driving pulsations applied by the nine apertures 25 on the nine pins 19. If a single driving pinion were utilized and the driving shaft 1 was rotating at 1000 R. P. M., this would result in a vibration frequency of 9000 pulses per minute. If an even number of pins and apertures is utilized, for instance 8, provision of two or more pinions, as shown here, would not change the pulsation frequency since opposite pins would receive maximum thrusts simultaneously from the two pinions. However, if an odd number of pins are used, as shown here, with two or more pinions, adjacent pinions being disposed 180° to each other, instead of 9 pulsations or thrusts per revolution of the driving shaft 1, there are 18 per revolution, the thrusts being staggered since no two pins are in direct opposition. It has been found that 9 pins is the minimum number which will effectively reduce the vibration due to the driving pulses. With nine pins, a driving speed of 1000 R. P. M. results in a pulsation frequency of 18,000 per minute. It was found that machines provided with an even number of pins were subject to excessive resonant vibrations when operated at high speeds on the order of 10,000 to 15,000 R. P. M. However, with the provision of 9 pins, the resonant frequency is thrown beyond the operating range of the machine and the magnitude of the pulses is reduced.

The vibration due to the thrusts or pulsations driving the pins 19 is not the only source of vibration in such a device. Another source of vibration is due to the centrifugal forces produced by the eccentric throw of the eccentrics. To effectively balance out these centrifugal forces, two pinions can be provided with their eccentrics disposed to each other by 180°. However, at high speeds, it has been found that a couple develops between the two pinions. Therefore, the arrangement shown in Fig. 1 using three pinions is provided. Here, the intermediate pinion 10 is disposed 180° from the two outer pinions 9 and 11, is proportioned so that its weight equals the combined weights of the outer two pinions, its thickness being twice that of one of the outer pinions. This arrangement effectively cancels the couple effect normally produced by two eccentrics rotating at high speed. In effect, this arrangement provides two pinions disposed 180° apart for canceling the centrifugal forces due to eccentric rotation, however, one of the pinions is split and the two halves placed on either side of the central pinion in order to cancel the couple effect present with two eccentrics.

Referring to Fig. 2, it will be seen that the teeth of pinions 9, 10, 11, and gear 12, are somewhat shorter than normal. It was found that the most efficient operation was secured using standard involute teeth, however, with the tops cut off. Due to the fact that the gearing is internal, there is a necessary limitation to a short addendum and therefor to only about six tenths of a tooth in the arc of action. In one machine constructed having 65 gear teeth and 64 pinion teeth, with the eccentricity of the eccentrics .0208", the pitch diameter of the pionion was 2.667", the pitch diameter of the gear 2.7083", the gear addendum .017", the pinion addendum .017", and the clearance between the gear teeth and pinion teeth .0076".

As seen above, the device described in Figs. 1 and 2 furnishes a 64/1 ratio with 65 gear teeth and 64 pinion teeth, the direction of rotation of the driven shaft 2 being opposite from the direction of rotation of the driving shaft 1.

In order to secure operation of the driven shaft in the same direction as the driving shaft, the arrangement now to be described is provided. Referring now to Figs. 3 and 4, there is shown another embodiment of this invention in which the pins are held stationary and the rotation transmitted to the internal gear. Here, the device is provided with driving shaft 26 and driven shaft 27 respectively journaled in anti-friction bearings 28 and 29 in stationary enclosure 30 and 31. Driving shaft 26 is provided with eccentrics 32 and 33 on which are mounted anti-friction bearings 34 and 35. Pinion gears 36 and 37 are respectively mounted on bearings 34 and 35 and, due to the positioning of eccentrics 32 and 33 with 180° displacement, are oppositely displaced with respect to the center line of the shaft 26. Driven shaft 27 is provided with internal gear 38 having internal teeth 39. Gear 38 may be supported on enclosure 31 with bearings 40 and driving shaft 26 may be supported in enclosure 30 by bearing 41.

As shown in Fig. 4, a plurality of teeth of the pinions 36 and 37 mesh with the teeth 39 of internal gear 38. Enclosure 31 is provided with a plurality of pins 42. As described above, the number of pins should be an odd number at least nine. These pins are provided with rotatable bushings 43 and are respectively seated in corresponding apertures 44 and 45 in pinions 36 and 37. These pinions and apertures are proportioned and arranged in the manner described under the discussion of Figs. 1 and 2 above.

In operation, rotation of driving shaft 26 and eccentrics 32 and 33 causes pinions 36 and 37 to roll eccentrically about gear 38. However, since pins 42 are restrained, the eccentric motion will be the only motion imparted to these pinions. As the pinions eccentrically roll, apertures 44 will be in constant rolling contact with bushings 43. It will now be readily apparent that due to the difference in teeth, again assuming the gear to have 65 teeth and pinions 64 teeth, when the pinions have completed one eccentric roll and returned to their initial position, pinion tooth 46 which initially meshed with gear tooth 47 will now mesh with gear tooth 48, thus advancing the internal gear one tooth for each revolution of the driving shaft 26 in the same direction as the shaft rotation. It can now be seen, that this arrangement provides a reduction of 65/1 and the rotation of driven shaft 27 will be in the same direction as driving shaft 26.

While the three-pinion arrangement shown in Figs. 1 and 2 is not shown in Figs. 3 and 4, it is to be understood that it could be utilized instead of the two-pinion arrangement shown if the speeds to be used are such that the presence of the couple becomes objectionable. In this embodiment, provision is made against thrust and pulsation vibration by the utilization of nine or more odd pins and the vibration due to centrifugal forces from the eccentric throw is canceled by provision of two pinions 180° disposed to each other. Tooth design in Figs. 3 and 4 would be similar to that described in Figs. 1 and 2.

It can be readily understood that this arrangement will provide a compact and efficient speed reduction unit with a minimum of vibration. A machine has been operated from 1000 to 12,000 R. P. M. with loadings from 120 lb. inches to 600 lb. inches with an average efficiency of 81%. It was found that there was no change of efficiency with the same load over the entire speed range. At 200 lb. inches, the efficiency remained 83.2% from 1000 to 8000 R. P. M. That the device is capable of operation at exceptionally high speeds is indicated by that fact that a machine using it has been operated up to 20,000 R. P. M.

While I have shown and described particular embodiments of this invention, modifications thereof will occur to those skilled in the art. I desire it to be understood therefore, that this invention is not to be limited to the particular arrangements disclosed and I intend in the appended claims to cover all modifications which do not depart from the spirit and scope of this invention.

What I claim as new and desire to secure by Letters Patent of the United States is:

1. A speed changing device comprising, a driving shaft having three eccentrics thereon, the eccentric intermediate the outer eccentrics being disposed 180° therefrom, three pinion gears respectively arranged concentric with and freely rotating on said eccentrics, the pinion intermediate the outer pinions being equal in weight to the combined weights of the two outer pinions, a stationary internal gear having a greater number of teeth than said pinions, each of said pinions having a plurality of teeth in mesh with said internal gear and being adapted to roll thereon in response to rotation of said eccentrics, a driven shaft, a member secured to said driven shaft and having a plurality of rotatable parts projecting therefrom, said parts being parallel to the axis of said driven shaft and equi-distant therefrom and equally spaced annularly, said pinions having a corresponding number of circular apertures therein similarly spaced, each of said rotatable parts extending through and seated in the corresponding apertures in said pinions whereby said parts roll around the inner periphery of said apertures as said pinions are rolled around said internal gear.

2. A speed changing device comprising, a driving shaft having three eccentrics thereon, the eccentric intermediate the outer eccentrics being disposed 180° therefrom, three pinion gears respectively arranged concentric with and freely rotating on said eccentrics, the pinion intermediate the outer pinions being equal in weight to the combined weights of the two outer pinions, a stationary internal gear having a greater number of teeth than said pinions, each of said pinions having a plurality of teeth in mesh with said internal gear and being adapted to roll thereon in response to rotation of said eccentrics, a driven shaft, a member secured to said driven shaft and having an odd number of pins over seven, said pins being parallel to the axis of said driven shaft and equi-distant therefrom and equally spaced annularly, said pinions having a corresponding number of circular apertures therein similarly spaced, each of said pins having a bushing and extending through and seated in the corresponding apertures in said pinions whereby said bushings roll around the inner periphery of said apertures as said pinions are rolled around said internal gear, the diameter of said apertures being equal to the diameter of said bushings plus twice the eccentricity of said eccentrics.

3. A speed changing device comprising, a driving shaft having three eccentrics thereon, the eccentric intermediate the outer eccentrics being disposed 180° therefrom, three pinion gears respectively arranged concentric with and freely rotating on said eccentrics, the pinion intermediate the outer pinions being equal in weight to the combined weights of the two outer pinions, a stationary internal gear having a greater number of teeth than said pinions, each of said pinions having a plurality of teeth in mesh with said internal gear and being adapted to roll thereon in response to rotation of said eccentrics, the teeth of said internal gear and said pinions being of involute form with the tops removed providing a shortened addendum substantially ⅗ of a normal tooth, a driven shaft, a member secured to said driven shaft and having an odd number of pins over seven, said pins being parallel to the axis of said driven shaft and equi-distant therefrom and equally spaced annularly, said pinions having a corresponding number of circular apertures therein similarly spaced, each of said pins having a bushing extending through and seated in the corresponding apertures in said pinions whereby said bushings roll around the inner periphery of said apertures as said pinions are rolled around said internal gear.

WILLIAM K. McIVER.

REFERENCES CITED

The following references are of record in the file of this patent:

UNITED STATES PATENTS

| Number | Name | Date |
| --- | --- | --- |
| 1,194,904 | Wagner | Aug. 15, 1916 |
| 1,647,191 | Norton | Nov. 1, 1927 |
| 1,770,035 | Heap et al. | July 8, 1930 |
| 1,833,648 | Johnson | Nov. 24, 1931 |

FOREIGN PATENTS

| Number | Country | Date |
| --- | --- | --- |
| 23,128 | Switzerland | Apr. 8, 1901 |
| 79,704 | Switzerland | Jan. 2, 1919 |